Jan. 20, 1959   F. R. SABERTON   2,869,340
SHAFT ASSEMBLIES
Filed June 20, 1957   2 Sheets-Sheet 2
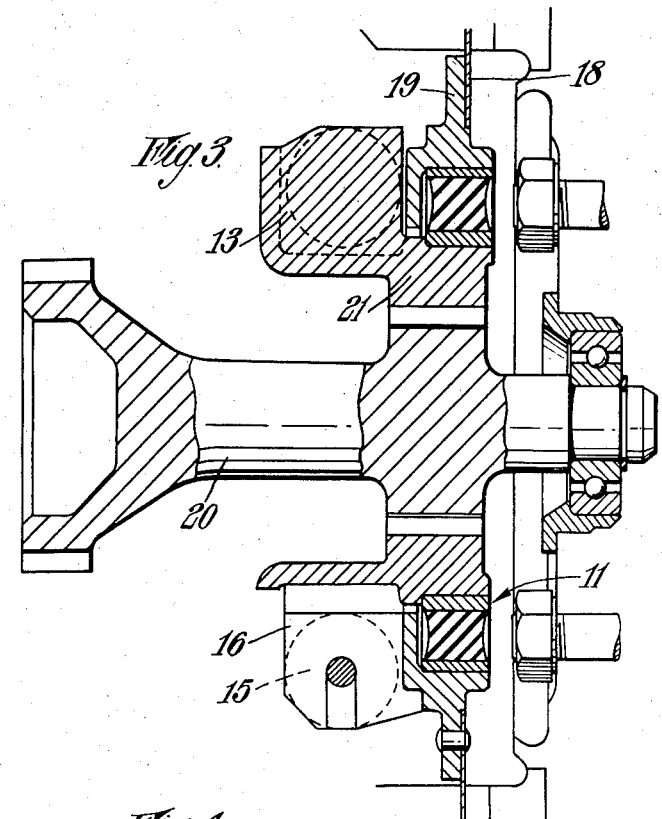
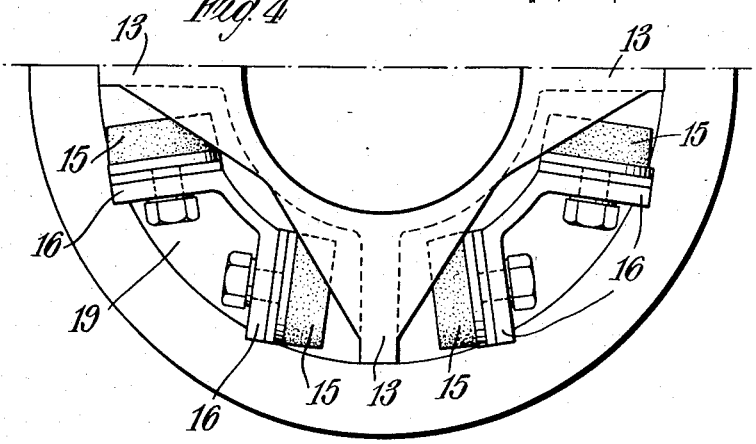
INVENTOR.
Frederick Richard Saberton

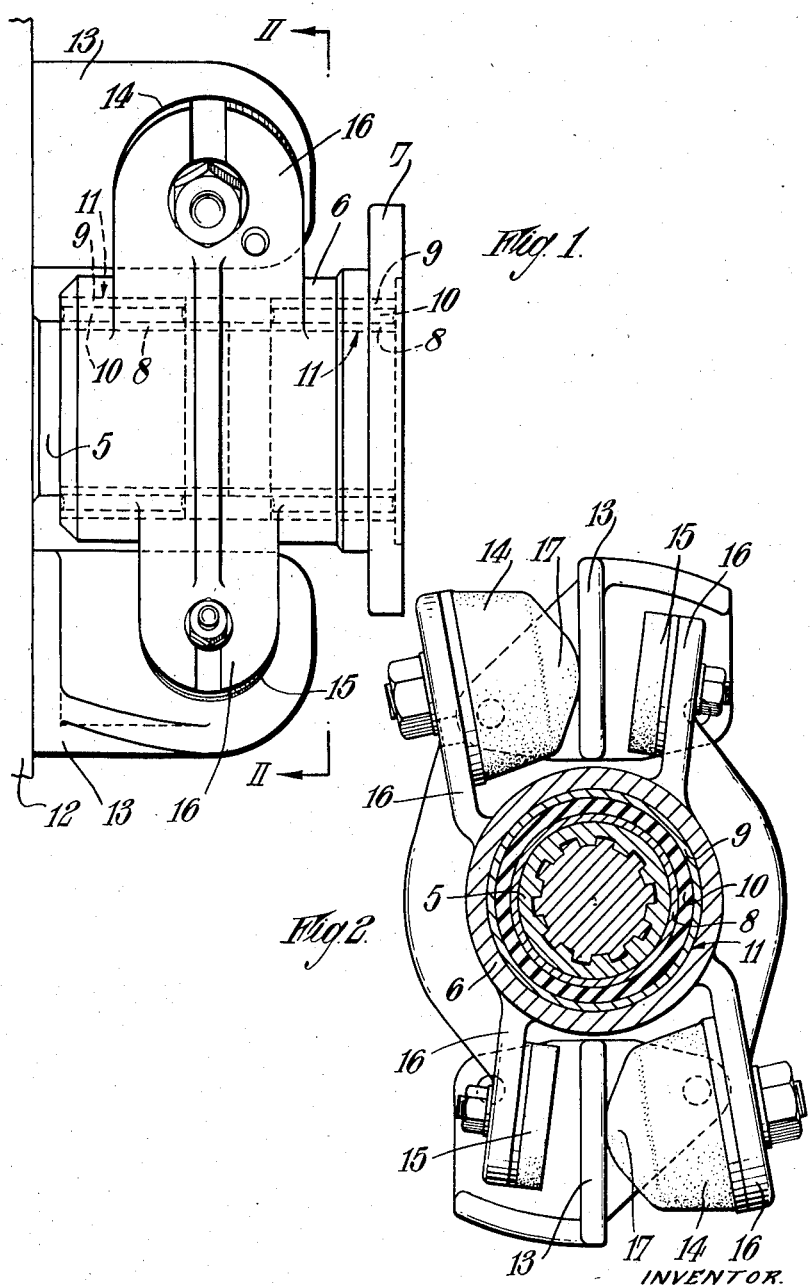

United States Patent Office 2,869,340
Patented Jan. 20, 1959

2,869,340

SHAFT ASSEMBLIES

Frederick Richard Saberton, Leicester, England, assignor to Metalastik Limited, Leicester, England Application June 20, 1957, Serial No. 666,862

Claims priority, application Great Britain July 16, 1956

4 Claims. (Cl. 64—11)

This invention concerns shaft assemblies and relates more particularly to shaft assemblies for use between the engine and the gear box of a road vehicle. In such an application it has been found that undesirable noise and vibration is set up when the engine is on light load because of intermittent engagement of the gears of the gear box (so-called gear rattle). The object of the invention is broadly to reduce or eliminate gear rattle, while ensuring that higher torques are effectively transmitted.

According to this invention a shaft assembly comprises a pair of concentric shafts nested one within the other, a sleeve of rubber or the like material therebetween, said sleeve being provided to transmit drive from one shaft to the other with a high torsional flexibility and being the only support between the shafts, and rubber or the like buffer means which is brought into use to transmit said drive when a certain degree of torsional deflection in the sleeve element is exceeded.

The sleeve may be bonded to the inner and/or outer shaft and furthermore the sleeve may be under radial compression between the shafts.

Two practical applications of the invention will now be described, by way of example only, with reference to the accompanying drawings whereof:

Fig. 1 is a side view of a shaft assembly according to this invention for transmitting torque from an internal combustion engine to the gear box of a road vehicle, Fig. 2 is a section on the line II—II of Fig. 1, Fig. 3 is a sectional side view of a shaft assembly according to the present invention, the assembly forming part of a clutch transmission, and Fig. 4 is an end view showing a part of the assembly of Fig. 3.

Referring to Figs. 1 and 2: a shaft 5 is driven by the engine (not shown) the shaft being nested within a tubular shaft 6 which carries a driving flange 7 for coupling to the gear box (not shown).

A cuff 8 is secured to the inner shaft 5 and a concentric cuff 9 is secured to the outer shaft 6. A rubber sleeve 10 lies between, and is bonded to, the cuffs. In practice the parts 8, 9 and 10 form a unit 11 which is separately manufactured and assembled on the shafts. In the particular arrangement being described two units 11 are provided end to end, adjacent ends being spaced to a small extent.

With the arrangement so far described drive from shaft 5 to shaft 6 is transmitted through the sleeves 10 of units 11 so that the rubber sleeve is under torsion while the shaft assembly is operative. Consequently when the engine is on light load the gears of the gear box are held in engagement at all times due to the torsional loading of the rubber sleeves. Gear rattle is thus avoided.

The shafts 5 and 6 are separated throughout their length and the sleeves 10 extend fully along the annular space between the shafts (except for the small central space therebetween) so that the sleeves 10 are the only support between the shafts 5, 6.

The rubber sleeves may be subject to precompression when manufacturing the units 11.

Instead of the units 11 the rubber sleeves may be located directly between the shafts 5, 6 being bonded thereto if required. Either two sleeves are provided end to end or a single sleeve is provided in this way between the shafts. The sleeve or sleeves may be subject to precompression.

The shaft 5 supports a carrier 12 having a pair of diametrically-opposite radial members 13 and shaft 6 carries buffer blocks 14, 15 arranged in pairs for each member 13. The buffer blocks, 14, 15 are mounted on arms 16 carried by shaft 6, the blocks being bolted to the arms 16 so that they may be readily removed and replaced if so required.

The blocks 14 being on opposite sides of the axial plane through members 13 they will both engage the members on relative rotation between shafts 5, 6 in one direction with torsional distortion of sleeves 10 beyond a specified value. Similarly blocks 15 will so engage the members 13 on rotation in the opposite direction. Thus, the buffers limit the amount of torsional deflection which sleeves 10 are required to take up, the drive being transmitted through the buffer blocks when said deflection is exceeded.

The shaft assembly of Figs. 1 and 2 is shown in the inoperative position (i. e. no torque is being transmitted) and in this position the buffer blocks 14 engage the members 13 so that these blocks provide a greater torsional stiffness. So that the stiffness of the blocks 14 shall not increase or come into effect abruptly the blocks have tapering noses 17 to engage members 13. The noses 17 may be of rounded convex form instead of tapering with substantially straight sides. Of course one buffer 14, 15 may be provided alone, the two buffers being on the same side of the axial plane containing members 13.

Figs. 3 and 4 illustrate an application of the invention to a clutch transmission between the engine and gear box of a road vehicle.

A clutch plate 18 is carried by a carrier 19 the latter being equivalent to the shaft 6 of the construction described with reference to Figs. 1 and 2. Splined to a driving shaft 20 is a member 21 which is fully equivalent to shaft 5. A unit 11 is provided between the carrier 19 and member 21 and an arrangement of buffers similar to that described above is also provided. The buffer blocks provide the same effect in both directions of rotation i. e. one pair of blocks do not provide greater torsional stiffness than the other.

In the arrangement of buffer blocks of Figs. 3 and 4 one pair of blocks may be angularly spaced by a greater amount than the other pair of blocks.

The rubber of one pair of blocks may provide a greater stiffness than the rubber of the other pair.

It may be arranged that the sleeve 10 is in torsional loading while the assembly is inoperative thereby to hold the buffer block 14 in engagement with the radial member 13.

In another arrangement for each member 13 there is at least two buffer blocks on the same side of the diametral plane through the members, said blocks or certain of them engaging the member in succession.

I claim:

1. A shaft assembly comprising a pair of concentric shafts nested one within the other, a sleeve of rubber-like material therebetween, said sleeve being provided to transmit drive from one shaft to the other with a certain torsional flexibility and being the only support between the shafts, a pair of diametrically opposed radial members carried by one of the shafts and at least a pair of rubber-like blocks carried by the other shaft to be on the same side of the diametrical plane through said radial members, at least one buffer block of each pair being angularly spaced from the radial member with which it engages to transmit said drive when said torsional flexibility is exceeded.

2. A shaft assembly comprising a pair of concentric shafts nested one within the other, a sleeve of rubber-like material therebetween, said sleeve being provided to transmit drive from one shaft to the other with a certain torsional flexibility and being the only support between the shafts, a pair of diametrically opposed radial members carried by one of the shafts and a pair of rubber-like blocks carried by the other shaft to be on the same side of the diametral plane through said radial members, one only of the buffer blocks engaging said radial member while the assembly is inoperative.

3. A shaft assembly as claimed in claim 2 in which the sleeve is in torsional loading while the assembly is inoperative thereby to hold said one buffer block in engagement with the radial member.

4. A shaft assembly according to claim 3 wherein the buffer block which engages the radial member while the assembly is inoperative has a tapering nose to engage said radial member.

References Cited in the file of this patent

UNITED STATES PATENTS

| | | |
|---|---|---|
| 2,122,837 | Guy | July 5, 1938 |
| 2,149,887 | Hickman | Mar. 7, 1939 |
| 2,262,975 | Strachovsky | Nov. 18, 1941 |
| 2,566,985 | Gee | Sept. 4, 1951 |
| 2,727,368 | Morton | Dec. 20, 1955 |
| 2,790,312 | Hagenlocher et al. | Apr. 30, 1957 |

FOREIGN PATENTS

| | | |
|---|---|---|
| 134,418 | Great Britain | Nov. 6, 1919 |